US010785360B2

(12) United States Patent
Lai et al.

(10) Patent No.: US 10,785,360 B2
(45) Date of Patent: Sep. 22, 2020

(54) ELECTRONIC DEVICE USED FOR VIDEO CONFERENCE

(71) Applicants: Tzu-Chien Lai, Taipei (TW); Shih-Yao Lin, New Taipei (TW)

(72) Inventors: Tzu-Chien Lai, Taipei (TW); Shih-Yao Lin, New Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 164 days.

(21) Appl. No.: 15/972,234

(22) Filed: May 7, 2018

(65) Prior Publication Data

US 2019/0020748 A1  Jan. 17, 2019

Related U.S. Application Data

(60) Provisional application No. 62/502,757, filed on May 7, 2017.

(51) Int. Cl.
*H04M 1/60* (2006.01)
*H04M 1/02* (2006.01)
(Continued)

(52) U.S. Cl.
CPC ...... *H04M 1/6033* (2013.01); *H04L 12/1813* (2013.01); *H04M 1/02* (2013.01);
(Continued)

(58) Field of Classification Search
None
See application file for complete search history.

(56) References Cited

U.S. PATENT DOCUMENTS 5,421,549 A * 6/1995 Richards ............... F16M 11/10
248/163.2
5,808,663 A * 9/1998 Okaya .................... H04N 7/142
348/14.1
(Continued)

FOREIGN PATENT DOCUMENTS

CN   1661272    8/2005
CN   201118824  9/2008
(Continued)

OTHER PUBLICATIONS

"Office Action of Taiwan Counterpart Application," dated Mar. 8, 2019, p. 1-p. 10.
(Continued)

*Primary Examiner* — Cynthia Segura
(74) *Attorney, Agent, or Firm* — JCIPRNET

(57) ABSTRACT

An electronic device including a main body, a driver module, and a plurality of expanded members is provided. The main body includes at least one image module. The driver module is movably disposed in the main body. The expanded members are disposed beside the main body and connected to the driver module, and each of the expanded members includes at least one of a radio module and a speaker module. The driver module is adapted to drive the expanded members to expand from a collapsed position to a use position, when the expanded members are located at the collapsed position, the expanded members are collapsed to the main body, and the expanded members are driven by the driver module to be expanded with respect to the main body and are moved to the use position.

17 Claims, 8 Drawing Sheets

(51) Int. Cl.
*H04L 12/18* (2006.01)
*H04N 7/14* (2006.01)
*H04M 1/62* (2006.01)
*H04N 7/15* (2006.01)
*H04L 12/58* (2006.01)

(52) U.S. Cl.
CPC .............. *H04M 1/62* (2013.01); *H04N 7/142* (2013.01); *H04L 51/10* (2013.01); *H04M 2250/62* (2013.01); *H04N 7/15* (2013.01)

(56) References Cited

U.S. PATENT DOCUMENTS

| | | | |
|---|---|---|---|
| 6,265,969 | B1 | 7/2001 | Shih |
| 6,356,642 | B1* | 3/2002 | Nakamura ............... H04R 1/02 181/144 |
| 6,491,266 | B1* | 12/2002 | Chen ...................... F16M 11/16 248/163.1 |
| 7,669,814 | B2* | 3/2010 | Bogel ..................... F16M 11/16 248/163.1 |
| 8,568,042 | B1* | 10/2013 | Brueckner ............. F16M 11/32 248/187.1 |
| 9,405,173 | B1* | 8/2016 | Okunami ................ H04N 7/142 |
| 9,531,996 | B1* | 12/2016 | Duys ...................... H04N 7/144 |
| 9,661,272 | B1* | 5/2017 | Daniel .................... H04N 7/15 |
| 9,671,830 | B2* | 6/2017 | Chen ..................... F16M 13/005 |
| 9,672,750 | B1* | 6/2017 | Brantley ................. G08G 5/04 |
| 2004/0021764 | A1* | 2/2004 | Driscoll, Jr. ........... G02B 13/06 348/14.08 |
| 2005/0117340 | A1 | 6/2005 | Lee et al. |
| 2007/0064092 | A1* | 3/2007 | Sandbeg ................ H04N 7/142 348/14.02 |
| 2008/0191105 | A1* | 8/2008 | Bogel .................... F16M 11/16 248/170 |
| 2009/0003246 | A1 | 1/2009 | Hung et al. |
| 2009/0190917 | A1* | 7/2009 | Chai ....................... G03B 17/00 396/428 |
| 2010/0118112 | A1* | 5/2010 | Nimri ..................... H04N 7/142 348/14.08 |
| 2014/0126740 | A1* | 5/2014 | Charles ................. H04R 1/1041 381/74 |
| 2015/0201113 | A1* | 7/2015 | Wood ................... G03B 17/561 348/376 |
| 2015/0312448 | A1* | 10/2015 | Stark ...................... F16M 13/02 348/374 |
| 2016/0098138 | A1* | 4/2016 | Park ....................... G06F 3/0416 345/173 |
| 2016/0316046 | A1* | 10/2016 | Zheng ................... H04M 1/0264 |
| 2016/0330402 | A1* | 11/2016 | Benetti .................. B25J 9/1676 |
| 2017/0197714 | A1* | 7/2017 | Golden .................. B60F 5/02 |
| 2017/0300051 | A1* | 10/2017 | Zhou ...................... G01S 19/13 |
| 2018/0288323 | A1* | 10/2018 | Masuki ............... H04N 5/23238 |

FOREIGN PATENT DOCUMENTS

| | | | |
|---|---|---|---|
| CN | 205071183 | | 3/2016 |
| JP | 08181893 | A * | 7/1996 ......... H04N 1/19594 |
| TW | M323773 | | 12/2007 |
| TW | 200826676 | | 6/2008 |
| TW | M482773 | | 7/2014 |
| WO | WO-9620559 | A1 * | 7/1996 ............. H04N 1/195 |

OTHER PUBLICATIONS

"Office Action of China Counterpart Application", dated Feb. 26, 2020, p. 1-p. 8.

* cited by examiner

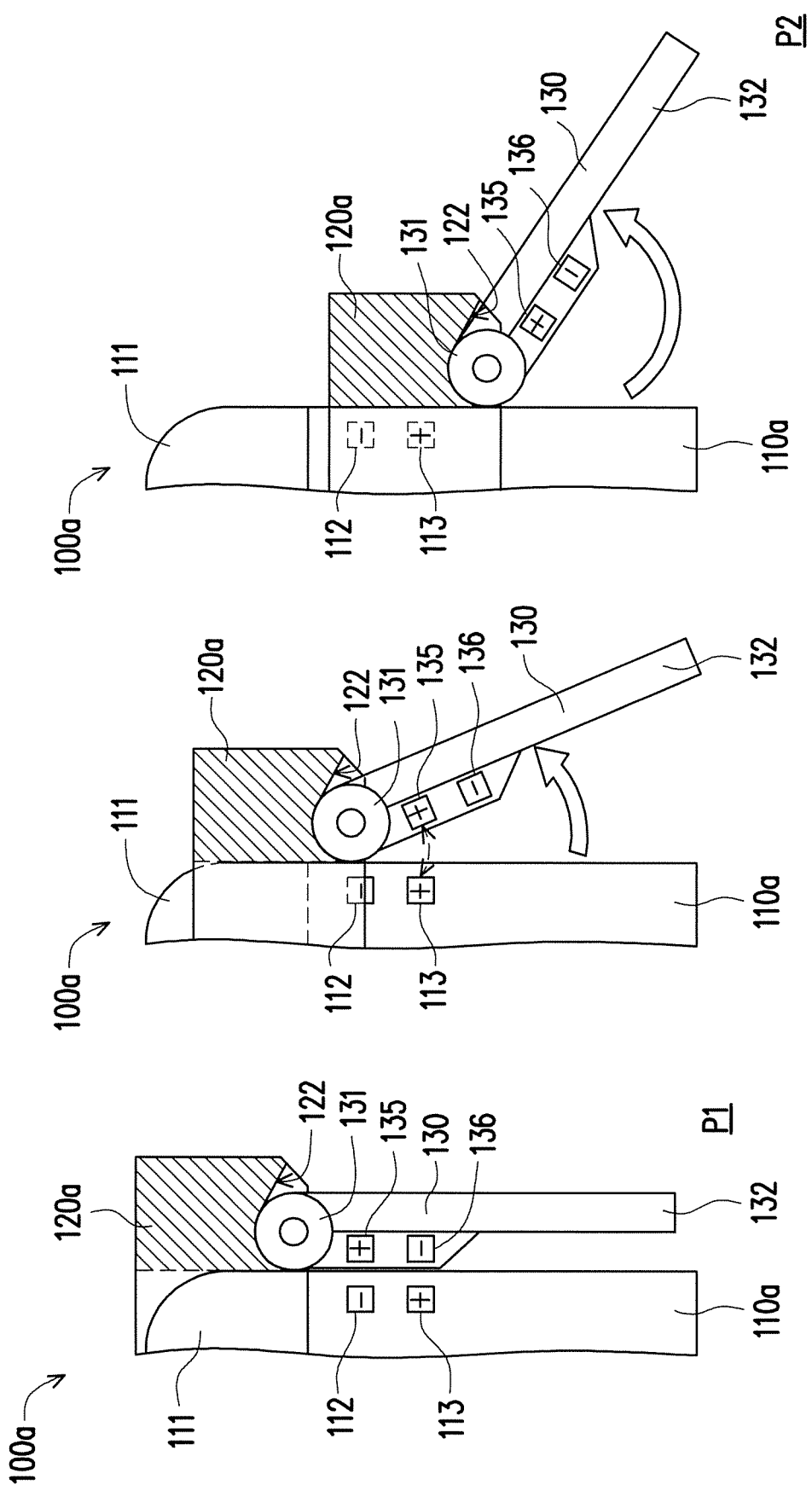

ELECTRONIC DEVICE USED FOR VIDEO CONFERENCE

CROSS-REFERENCE TO RELATED APPLICATION

This application claims the priority benefits of U.S. provisional application Ser. No. 62/502,757, filed on May 7, 2017. The entirety of the above-mentioned patent application is hereby incorporated by reference herein and made a part of this specification.

BACKGROUND OF THE INVENTION

Field of the Invention

The invention relates to an electronic device, and more particularly, to an electronic device that can be used for video conference.

Description of Related Art

With the trend of internationalization, in addition to voice calls, people at different locations can also carry out discussions via video, such that the users can further see a dynamic image of the other parties via a screen during the conference to more accurately understand the other parties. When the number of attendees to a video conference is greater, how to transmit sound of the other parties to the users located in different directions or how to clearly receive the sound of the users located in different directions is a research focus.

SUMMARY OF THE INVENTION

The invention provides an electronic device having a plurality of expanded members that can be expanded with respect to a main body, and each of the expanded members has at least one of a radio module and a speaker module and can receive sound or transmit sound in different directions.

An electronic device of the invention includes a main body, a driver module, and a plurality of expanded members. The main body includes at least one image module. The driver module is movably disposed in the main body. The expanded members are disposed beside the main body and connected to the driver module, and each of the expanded members includes at least one of a radio module and a speaker module. The driver module is adapted to drive the expanded members to expand from a collapsed position to a use position, and when the expanded members are located in the collapsed position, the expanded members are collapsed to the main body, and the expanded members are driven by the driver module to be expanded with respect to the main body and are moved to the use position.

In an embodiment of the invention, the driver module contains a sliding member slidably disposed in the main body along an axis, wherein when the sliding member is located at a first position with respect to the main body, the sliding member shields the image module, and the expanded members are collapsed to the main body, and when the sliding member is moved to a second position along the axis with respect to the main body, the image module is exposed to the sliding member, and the expanded members are driven by the sliding member and expanded with respect to the main body.

In an embodiment of the invention, the sliding member is a ring structure sleeved on the main body.

In an embodiment of the invention, the image module includes at least one image capture device, and when the expanded members are located at the use position, the expanded members are driven by the driver module and expanded with respect to the main body, and the image capture modules are activated at the same time.

In an embodiment of the invention, the electronic device further includes a plurality of linkage rod groups respectively corresponding to the expanded members. Each of the linkage rod groups includes a first linkage rod and a second linkage rod. The first linkage rod is fixed to the corresponding expanded member and includes a first end and a second end opposite to each other, wherein the first end is pivoted to the sliding member. The second linkage rod includes a third end and a fourth end opposite to each other, wherein the third end of the second linkage rod is pivoted to the second end of the first linkage rod, and the fourth end is pivoted to the main body.

In an embodiment of the invention, when the sliding member is located at the first position with respect to the main body, an extending direction of the first linkage rod is not parallel to the axis.

In an embodiment of the invention, the main body includes a first magnetic pole, each of the expanded members includes a second magnetic pole, magnetic property of the first magnetic pole and magnetic property of the second magnetic pole are the same, when the sliding member is located at the first position, a position of the second magnetic pole of each of the expanded members are moved away from the first magnetic pole, and when the sliding member is moved toward the second position, the second magnetic pole of each of the expanded members approaches toward the first magnetic pole of the main body and is subjected to a magnetic repulsion of the first magnetic pole and is rotated outward with respect to the main body.

In an embodiment of the invention, each of the expanded members includes a first end portion disposed beside the main body in a surrounding manner and pivoted to the sliding member and a second end portion away from the first end portion, when the sliding member is located at the first position, the second end portion of each of the expanded members is adjacent to the main body, and when the sliding member is moved toward the second position, the second end portion of each of the expanded members is away from the main body, and each of the expanded members is rotated outward with respect to the main body and expanded.

In an embodiment of the invention, the main body includes a first magnetic pole and a second magnetic pole arranged along the axis and having opposite magnetic properties, each of the expanded members includes a third magnetic pole and a fourth magnetic pole having opposite magnetic properties, when the sliding member is located at the first position, the third magnetic pole and the fourth magnetic pole of each of the expanded members are respectively subjected to a magnetic attraction of the first magnetic pole and the second magnetic pole of the main body and collapsed to the main body, and when the sliding member is moved toward the second position, the third magnetic pole of each of the expanded members approaches toward the second magnetic pole of the main body and is subjected to a magnetic repulsion of the second magnetic pole and rotated outward with respect to the main body.

In an embodiment of the invention, the sliding member includes a limiting surface, and when the sliding member is located at the second position, each of the expanded members is in contact with the limiting surface at a section adjacent to the first end portion.

In an embodiment of the invention, the main body includes a guide groove extended along the axis, a normal direction of a bottom wall of the guide groove is not perpendicular to the axis, and the first end portion of each of the expanded members is slidably disposed in the guide groove along the bottom wall.

In an embodiment of the invention, the depth of the guide groove is gradually reduced along the axis.

In an embodiment of the invention, the electronic device further includes a driving member disposed on a movement path of the sliding member, one of the driving member and the main body includes a chute and the other includes a sliding block extended into the chute, the chute is not parallel to the axis, when the sliding member is moved from the first position to the second position, the driving member is pushed by the sliding member and moved along an extending direction of the chute with respect to the main body, and each of the expanded members is pushed by the driving member and rotated outward.

In an embodiment of the invention, the driving member includes a support ramp, and when the sliding member is located at the second position, the support ramp supports a section of the corresponding expanded member adjacent to the first end portion.

In an embodiment of the invention, the electronic device further includes a base detachably assembled to the main body.

In an embodiment of the invention, the main body further includes at least one of a wireless communication module, an output/input interface, and a battery.

In an embodiment of the invention, when the expanded members are located at the use position, the expanded members are driven by the driver module and expanded with respect to the main body, and at least one of the radio module and the speaker module is activated at the same time.

Based on the above, the main body of the electronic device of the invention has an image module, each of the expanded members includes at least one of a radio module and a speaker module, the image module is exposed simply by moving the sliding member to capture an image, and the expanded members disposed beside the main body in a surrounding manner can be expanded toward different directions with respect to the main body and can receive the sound of users located in different directions or transmit sound to the users located in different directions to provide good video effect.

In order to make the aforementioned features and advantages of the disclosure more comprehensible, embodiments accompanied with figures are described in detail below.

BRIEF DESCRIPTION OF THE DRAWINGS

FIG. 5 to FIG. 7 are schematics of a sliding member of an electronic device moving from a first position to a second position according to another embodiment of the invention.

DESCRIPTION OF THE EMBODIMENTS

Figure 1:
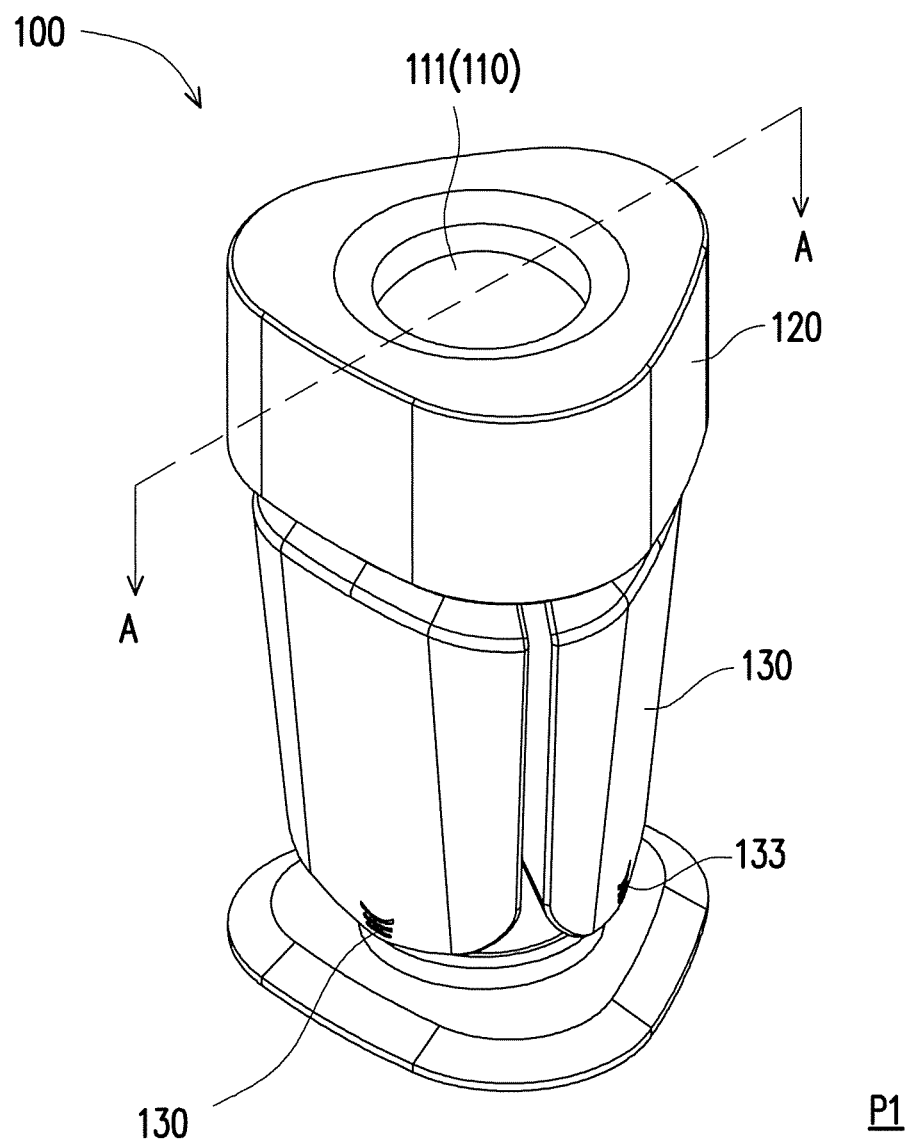
FIG. 1 is a schematic of a sliding member of an electronic device located at a first position according to an embodiment of the invention.
Figure 2:
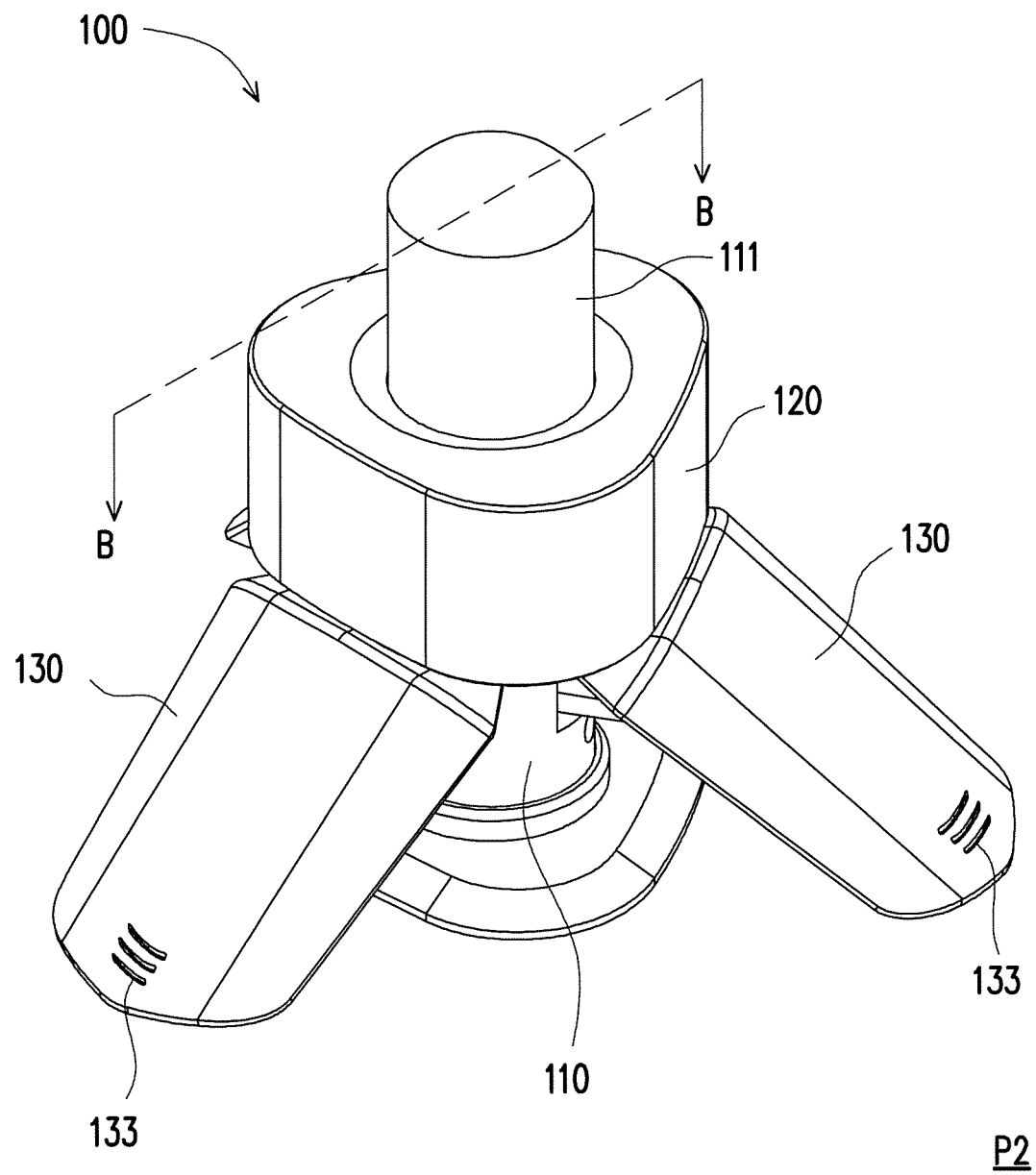
FIG. 2 is a schematic of the sliding member of the electronic device of FIG. 1 located at a second position.

FIG. 1 is a schematic of a sliding member of an electronic device located at a first position according to an embodiment of the invention. FIG. 2 is a schematic of the sliding member of the electronic device of FIG. 1 located at a second position. Referring to FIG. 1 and FIG. 2, an electronic device 100 of the present embodiment includes a main body 110, a driver module, and a plurality of expanded members 130. The main body 110 includes at least one image module 111. The driver module is movably disposed in the main body 110. The driver module is adapted to drive the expanded members 130 to expand from, for instance, a collapsed position shown in FIG. 1 to, for instance, a use position shown in FIG. 2. When the expanded members 130 are located in the collapsed position (such as FIG. 1), the expanded members 130 are collapsed to the main body 110. The expanded members 130 can be driven by the driver module and be expanded with respect to the main body 110 and be moved to the use position (such as FIG. 2).

In the present embodiment, the driver module is, for instance, a sliding member 120 that can be moved by force applied by a user to drive the expanded members 130. Of course, in other embodiments, the driver module can also be a structure driving the expanded members 130 in other forms such as electricity or an electromagnet after being triggered by a user (such as by pressing a button), and the type of the driver module is not limited thereto.

In the present embodiment, the image module 111 is located at the top portion of the main body 110, but the position of the image module 111 with respect to the main body 110 is not limited thereto. Moreover, in the present embodiment, the quantity of the image module 111 is exemplified by one, but in other embodiments, the image module 111 can also be a plurality and/or a variety, and the quantity of the image module 111 is not limited thereto. In the present embodiment, the image module includes at least one image capture module. The image capture module is exemplified by a 360-degree image capture module (panoramic camera module) and can capture a 360-degree image. Therefore, when a video conference is carried out by the electronic device 100 as shown in FIG. 2, the user only needs to place the electronic device 100 on the conference table, and the images of the users sitting around the conference table can be captured by the image capture module. Of course, in other embodiments, the image capture module can be a dual lens module, fisheye lens module, or wide-angle lens module, for capturing, for instance, a 170-degree image, and the type of the image capture module or the image angle captured is not limited thereto, and the type of the image module 111 is also not limited thereto. Moreover, each of the expanded members 130 includes at least one of a radio module 133 and a speaker module (not shown). Moreover, in an embodiment, the main body 110 further includes at least one of a wireless communication module, an output/input interface, and a battery. In an embodiment, the electronic device further includes a base detachably assembled to the main body 110, and the base can at least be used to support the main body 110.

Figure 3:
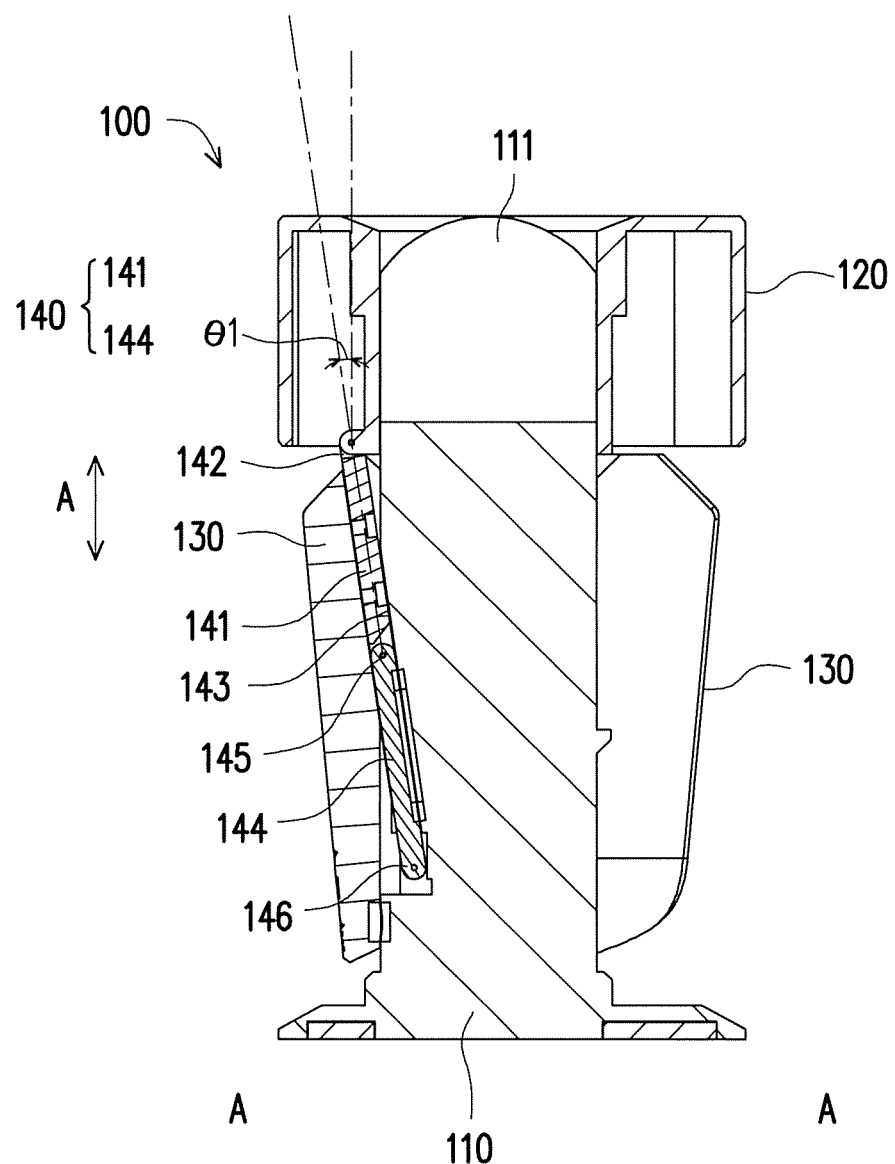
FIG. 3 is a cross section along the A-A line segment of FIG. 1.

As shown in FIG. 1 and FIG. 2, in the present embodiment, the sliding member 120 is slidably disposed in the main body 110 along an axis A (labeled in FIG. 3, such as an up and down direction). In the present embodiment, the sliding member 120 is a ring structure sleeved on the main body 110, but the form of the sliding member 120 is not limited thereto. The expanded members 130 are disposed (such as in a surrounding manner) beside the main body 110 and linked to the sliding member 120. It can be seen from FIG. 1 that, when the sliding member 120 is located at the first position P1 with respect to the main body 110, the sliding member 120 shields the image module 111, and the expanded members 130 are collapsed to the main body 110. At this point, the expanded members 130 are located at the collapsed position. It can be seen from FIG. 2 that, when the sliding member 120 is moved to the second position P2 along the axis A with respect to the main body 110, the image module 111 is exposed from the sliding member 120, and the expanded members 130 are driven by the sliding member 120 to be expanded toward different directions with respect to the main body 110. At this point, the expanded members 130 are located at the use position. As a result, the radio module 133 of the expanded members 130 can receive the sound of users located in different directions and can provide good video effect. If the expanded members 130 include a speaker module, then sound can be transmitted to the users located in different directions.

In an embodiment, the main body 110 can further include a circuit board module (not shown) respectively electrically connected to the image module 111 and the radio module 133 and/or the speaker module, and in an embodiment, the operation of the electronic device 100 includes, for instance, when the sliding member 120 is pushed down to the second position P2, the image module 111 receives light and transmits the information to the circuit board module, and the circuit board module activates the radio module 133, the speaker module, and/or the image module 111 (such as the image capture module). Of course, the electronic device 100 can also control the image module 111, the radio module 133, the speaker module, and/or the image module 111 (such as the image capture module) to operate at the same time via a switch electrically connected to the circuit board module.

Moreover, in an embodiment, the main body 110 can further include a wireless communication module (not shown) and a battery (not shown) electrically connected to the circuit board module, and image or sound captured by the image module 111 and the radio module 133 can be transmitted to an external device in a wireless manner via a wireless communication module. In an embodiment, the circuit board module includes an output/input interface (not shown), and the output/input interface includes, for instance, a network interface (such as an RJ 11 interface or RJ 45 interface) or a power outlet, and the image or sound captured by the image module 111 and the radio module 133 can also be transmitted to an external device in a wired manner.

Figure 4:
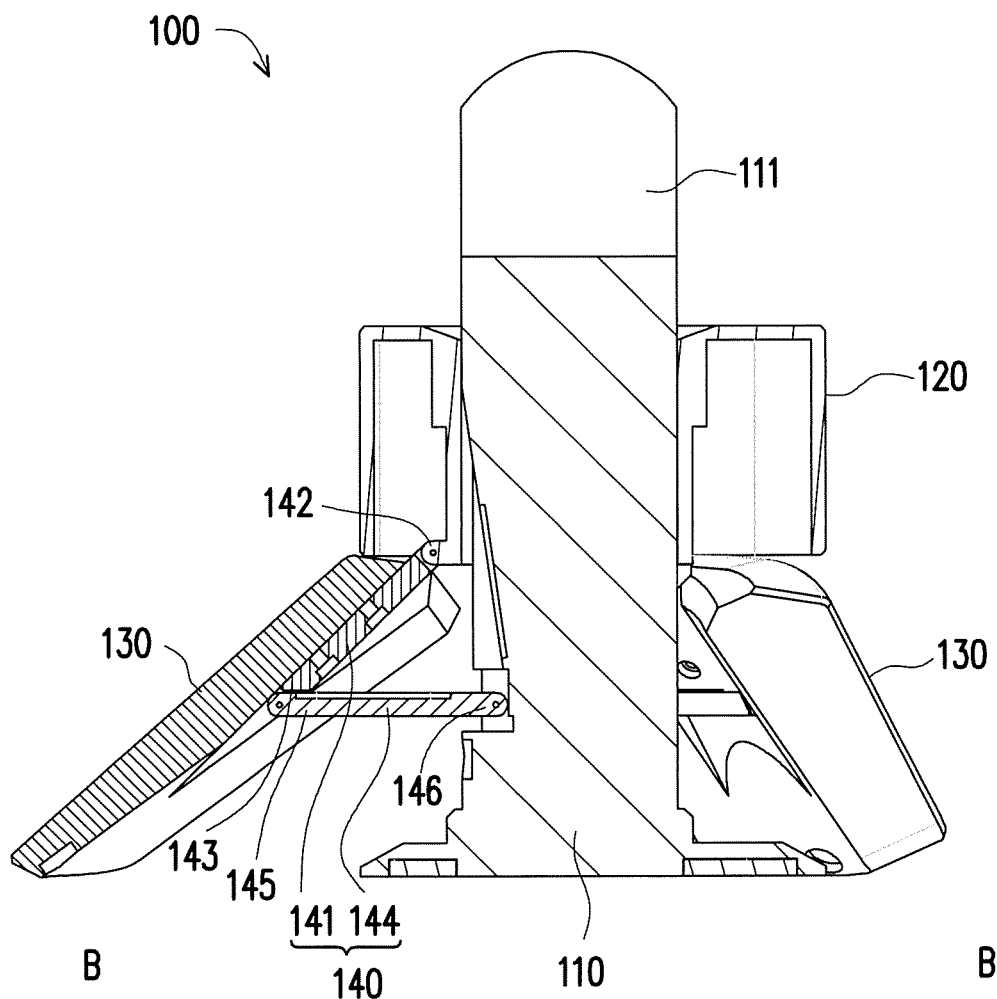
FIG. 4 is a cross section along the B-B line segment of FIG. 2.

In the following, the connection relationship between the main body 110, the sliding member 120, and the expanded members 130 is further described. FIG. 3 is a cross section along the A-A line segment of FIG. 1. FIG. 4 is a cross section along the B-B line segment of FIG. 2. Referring to FIG. 3 and FIG. 4, in the present embodiment, the electronic device 100 further includes a plurality of linkage rod groups 140 respectively corresponding to the expanded members 130. It should be mentioned that, due to the cross section perspective, only one linkage rod group 140 is seen in FIG. 3 and FIG. 4, and in actuality, the quantity and position of the linkage rod group 140 correspond to the quantity and position of the expanded members 130.

In the present embodiment, the linkage rod group 140 includes a first linkage rod 141 and a second linkage rod 144. The first linkage rod 141 is fixed to the corresponding expanded member 130 and includes a first end 142 and a second end 143 opposite to each other, and the first end 142 is pivoted to the sliding member 120. The second linkage rod 144 includes a third end 145 and a fourth end 146 opposite to each other. The third end 145 of the second linkage rod 144 is pivoted to the second end 143 of the first linkage rod 141, and the fourth end 146 is pivoted to the main body 110. Therefore, in the present embodiment, when the sliding member 120 is pulled down and moved toward the second position P2 along the axis A with respect to the main body 110, the sliding member 120 drives the first end 142 of the first linkage rod 141 downward, and since the fourth end 146 of the second linkage rod 144 is only rotated with respect to the main body 110 and the position thereof is not changed on the axis A (up and down direction) with respect to the main body 110, the first linkage rod 141 and the second linkage rod 144 are correspondingly rotated until the position shown in FIG. 4, and as a result the expanded members 130 are rotated outward as the first linkage rod 141 is rotated outward with respect to the main body 110.

Moreover, in the present embodiment, to facilitate the downward movement of the sliding member 120, as shown in FIG. 3, in the present embodiment, when the sliding member 120 is located at the first position P1 with respect to the main body 110, an extending direction of the first linkage rod 141 is not parallel to the axis A. As a result, when the user applies force to pull down the sliding member 120, the sliding member 120 can provide a component force not parallel to the extending direction of the first linkage rod 141 to the first linkage rod 141 such that the first linkage rod 141 is smoothly rotated. Moreover, if the electronic device 100 is to have a smaller overall width, then the angle between the extending direction of the first linkage rod 141 and the axis A can be designed between, for instance, 5 degrees and 20 degrees. Of course, the angle θ1 between the extending direction of the first linkage rod 141 and the axis A is not limited to the above.

FIG. 5 to FIG. 7 are schematics of a sliding member of an electronic device moving from a first position to a second position according to another embodiment of the invention. Referring to FIG. 5 to FIG. 7, in the present embodiment, the expanded members 130 of an electronic device 100a are pivoted to a sliding member 120a. More specifically, the expanded members 130 include a first end portion 131 pivoted to the sliding member 120a and a second end portion 132 away from the first end portion 131. Moreover, in the present embodiment, the main body 110a includes a first magnetic pole 112 and a second magnetic pole 113 arranged along the movement direction of the sliding member 120a and having opposite magnetic properties, and each of the expanded members 130 includes a third magnetic pole 135 and a fourth magnetic pole 136 having opposite magnetic properties. In the present embodiment, the magnetic properties of the first magnetic pole 112 and the third magnetic pole 135 are opposite, and the magnetic properties of the second magnetic pole 113 and the fourth magnetic pole 136 are opposite.

It can be seen in FIG. 5 that, in the present embodiment, when the sliding member 120a is located at the first position P1, the third magnetic pole 135 and the fourth magnetic pole 136 of the expanded members 130 are respectively subjected to the magnetic attraction of the first magnetic pole 112 and the second magnetic pole 113 of the main body 110a, and the second end portion 132 of the expanded members 130 approaches the main body 110a and is collapsed to the main body 110a. It can be seen in FIG. 6 that, when the sliding member 120a is moved toward the second position P2, the third magnetic pole 135 of the expanded members 130 approaches toward the second magnetic pole 113 of the main body 110a, and since the magnetic properties of the second magnetic pole 113 and the third magnetic pole 135 are the same, the third magnetic pole 135 is subjected to the magnetic repulsion of the second magnetic pole 113 such that the second end portion 132 is away from the main body 110a, and the expanded members 130 are rotated outward with the sliding member 120a with respect to the main body 110a and expanded to the second position P2 of FIG. 7.

In the present embodiment, the sliding member 120a includes a limiting surface 122 located on the inside of the bottom portion of the sliding member 120a, and when the sliding member 120a is located at the first position P1, the section of the expanded members 130 adjacent to the first end portion 131 is not in contact with the limiting surface 122. When the sliding member 120a is located at the second position P2, the section of the expanded members 130 adjacent to the first end portion 131 is in contact with the limiting surface 122 of the sliding member 120a, and the expanded members 130 are stopped by the limiting surface 122 and are not further rotated outward.

It should be mentioned that, the method of rotating the expanded members 130 outward via magnetic repulsion is not limited to the above. In an embodiment not shown, the main body 110a can also only include one magnetic pole, each of the expanded members 130 can also only include one magnetic pole, and the magnetic properties of the magnetic pole of the main body 110a are the same as the magnetic properties of the magnetic pole of each of the expanded members 130. When the sliding member 120a is located at the first position P1, the position of the magnetic pole of each of the expanded members 130 is away from the magnetic pole of the main body 110a, and when the sliding member 120a is moved toward the second position P2, the magnetic pole of each of the expanded members 130 approaches toward the magnetic pole of the main body 110a, and each of the expanded members 130 is subjected to magnetic repulsion and rotated outward with respect to the main body 110a.

Figure 10:
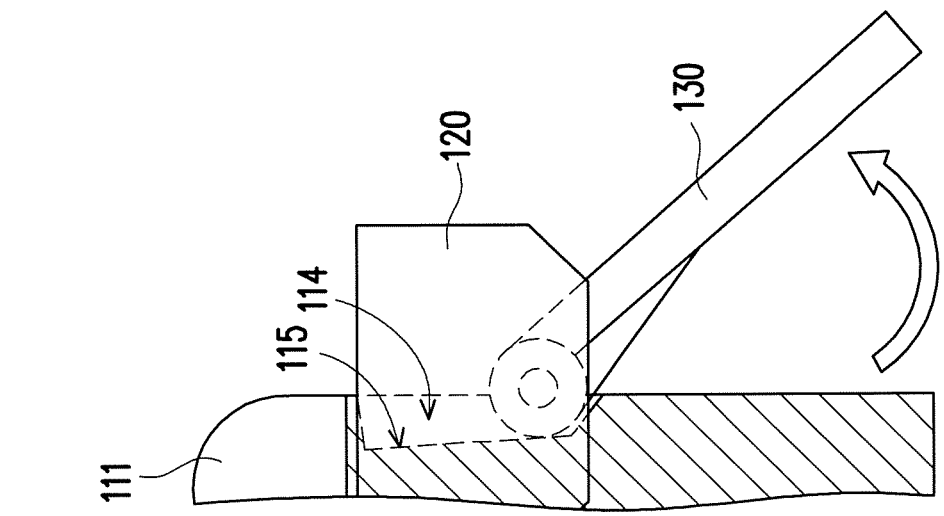
FIG. 8 to FIG. 10 are schematics of a sliding member of an electronic device moving from a first position to a second position according to another embodiment of the invention.
Figure 9:
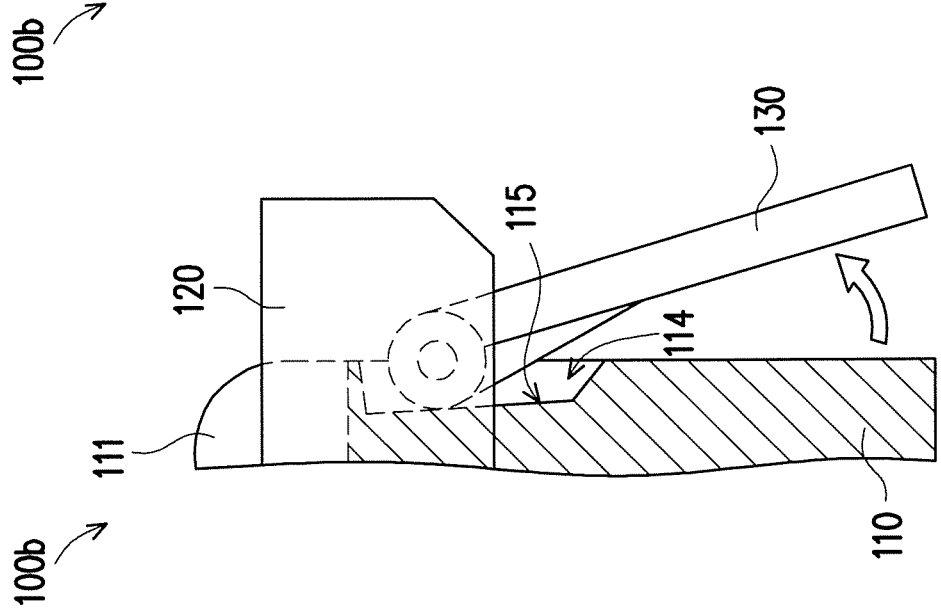
Figure 8:
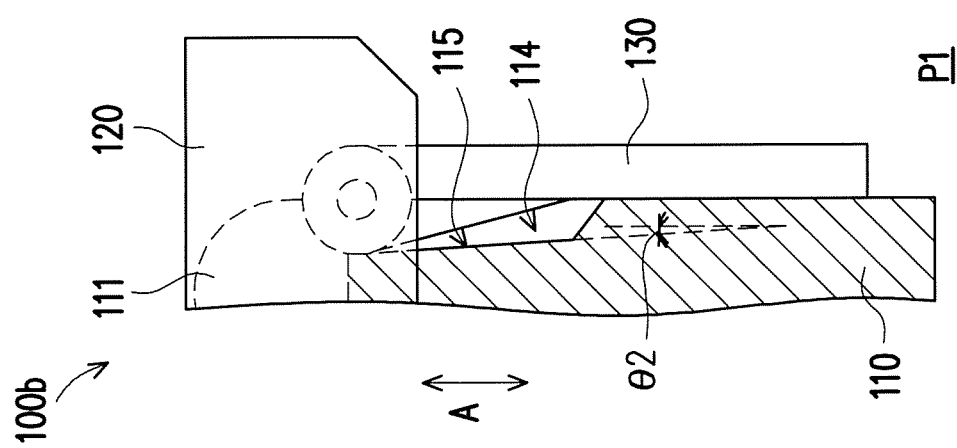

FIG. 8 to FIG. 10 are schematics of a sliding member of an electronic device moving from a first position to a second position according to another embodiment of the invention. Referring to FIG. 8 to FIG. 10, in the present embodiment, a main body 110 of the electronic device 110b includes a guide groove 114 extended along the axis A, and the extension line of the bottom wall 115 of the guide groove 114 is not parallel to the axis A. In other words, the normal direction of the bottom wall 115 of the guide groove 114 is not perpendicular to the axis A. In the present embodiment, as shown in FIG. 8, an angle θ2 between the extension line of the bottom wall 115 of the guide groove 114 and the axis A is, for instance, between 5 degrees and 20 degrees, but the range of the angle θ2 is not limited thereto. In the present embodiment, the depth of the guide groove 114 is gradually reduced in a direction away from the image module 111 along the axis A such that the extension line of the bottom wall 115 of the guide groove 114 is not parallel to the axis A. However, in other embodiments, the guide groove 114 can also be a chute 116 of equal depth, and the form of the guide groove 114 is not limited thereto.

It can be seen in FIG. 8 to FIG. 10 that, in the present embodiment, when the sliding member 120 is moved from the first position P1 toward the second position P2, the sliding member 120 drives the first end portion 131 of the expanded members 130 downward, and the first end portion 131 of the expanded members 130 slides along the bottom wall 115 of the guide groove 114 such that the second end portion 132 of the expanded members 130 is gradually moved away from the main body 110, and the expanded members 130 can be rotated outward with respect to the main body 110 and be expanded as a result.

Figure 11:
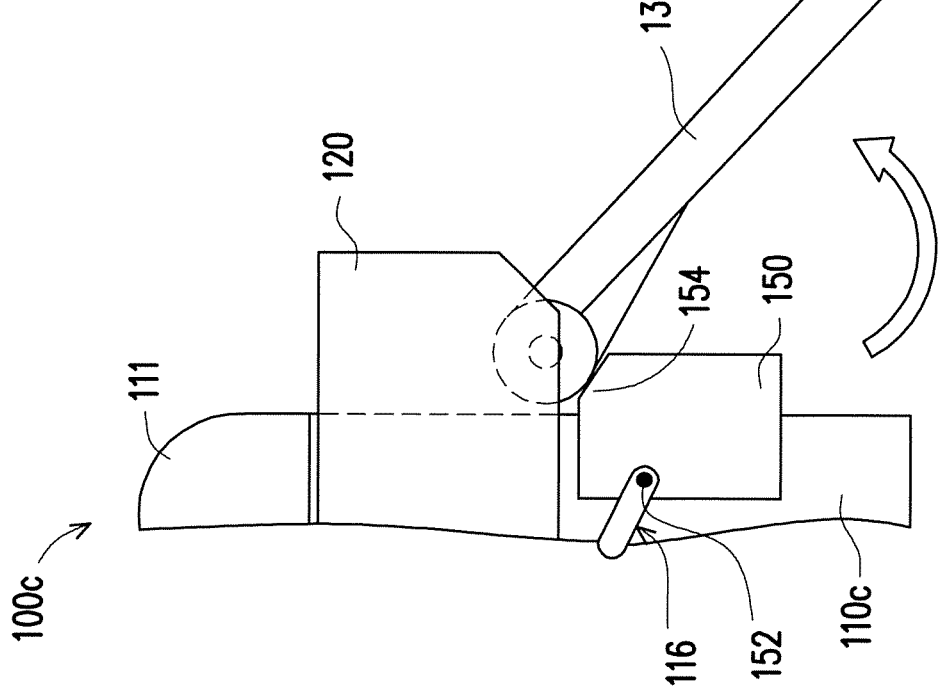
FIG. 11 to FIG. 12 are schematics of a sliding member of an electronic device moving from a first position to a second position according to another embodiment of the invention.
Figure 12:
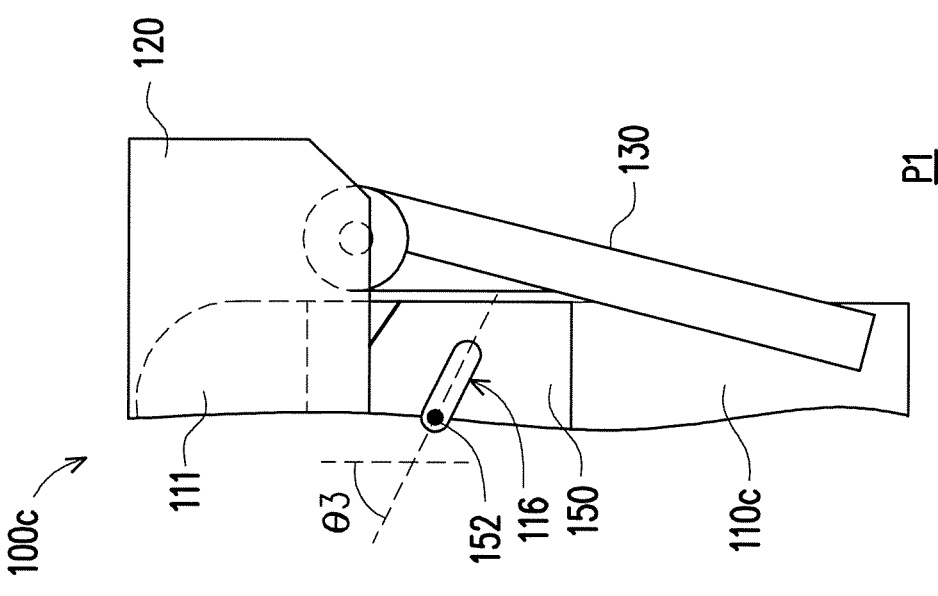

FIG. 11 to FIG. 12 are schematics of a sliding member of an electronic device moving from a first position to a second position according to another embodiment of the invention. Referring to FIG. 11 to FIG. 12, in the present embodiment, an electronic device 100c further includes a driving member 150 disposed on the movement path of the sliding member 120, such as disposed below the sliding member 120. One of the driving member 150 and the main body 110c includes a chute 116, and the other includes a sliding block 152 extended into the chute 116. In the present embodiment, the main body 110c includes the chute 116, and the driving member 150 includes the sliding block 152 extended into the chute 116. However, in other embodiments, the driving member 150 can also include the chute 116, and the main body 110c can also include the sliding block 152 extended into the chute 116. In can be seen in FIG. 11 that, the chute 116 is not parallel to the axis A, and in the present embodiment, an angle θ3 between the extending direction of the chute 116 and the axis A is, for instance, between 5 degrees and 80 degrees, but the range of the angle θ3 between the extending direction of the chute 116 and the axis A is not limited thereto.

In the present embodiment, when the sliding member 120 is moved from the first position P1 to the second position P2, the driving member 150 is pushed by the sliding member 120 and moved along the extending direction of the chute 116 with respect to the main body 110c, and the expanded members 130 are pushed by the driving member 150 and rotated outward. Moreover, in the present embodiment, the driving member 150 includes a support ramp 154 located on the outer side of the top portion of the driving member 150, and when the sliding member 120 is located at the first position P1, the support ramp 154 is separated from the section of the corresponding expanded member 130 adjacent to the first end portion 131. When the sliding member 120 is located at the second position P2, the support ramp 154 supports the section of the corresponding expanded member 130 adjacent to the first end portion 131 such that the expanded member can stay at the second position P2.

Figure 13:
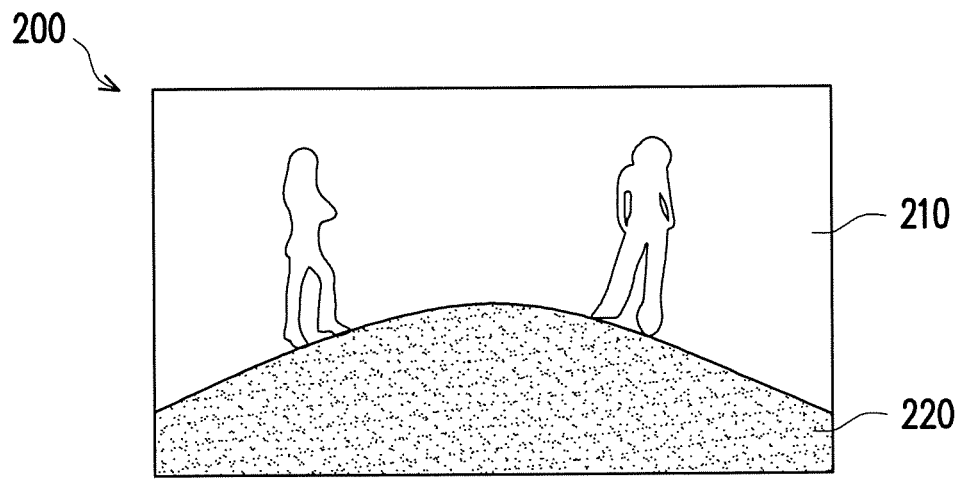
FIG. 13 is an original image captured by an image module of an electronic device of an embodiment of the invention.

FIG. 13 is an original image captured by an image module of an electronic device of an embodiment of the invention. Referring to FIG. 13, in the electronic devices 100, 100a, 100b, and 100c above, since the sliding members 120 and 120a are located below the image module 111 when moved to the second position P2, the original image 200 captured by the image module 111 may contain an effective portion 210 (such as the upper half portion of FIG. 13) and a shielded portion 220 (such as the lower half portion of FIG. 13) shielded by the sliding members 120 and 120a. A processor (not shown) of the circuit board modules of the electronic devices 100, 100a, 100b, and 100c above can process the original image 200 of FIG. 13.

Figure 14:
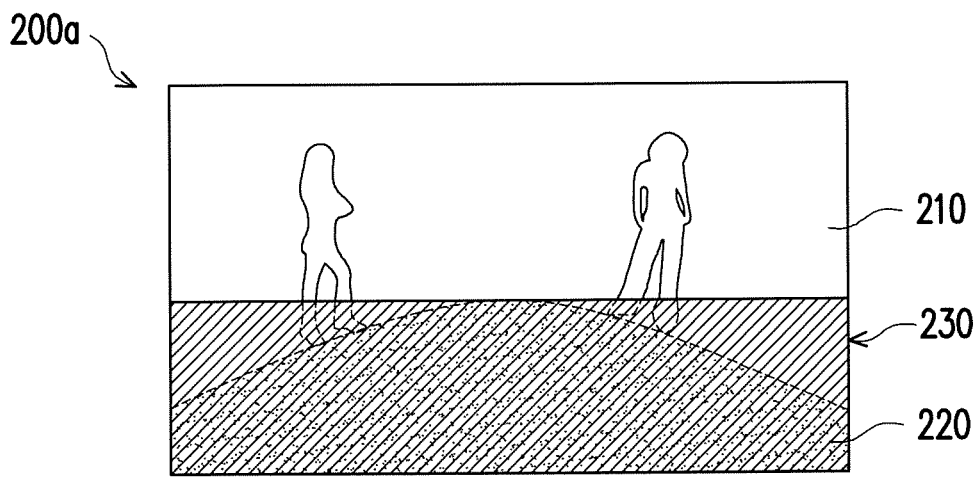
FIG. 14 and FIG. 15 are respectively display images after the original image of FIG. 13 is processed.
Figure 15:
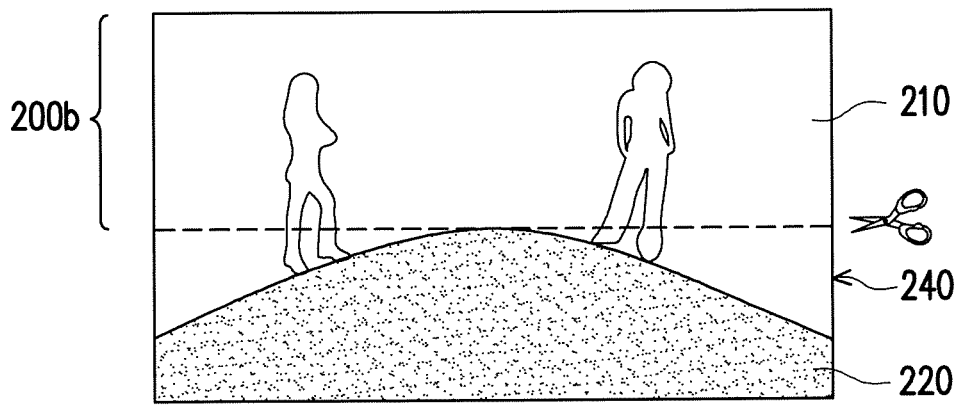

FIG. 14 and FIG. 15 are respectively display images after the original image of FIG. 13 is processed. Referring first to FIG. 14, the processor can, for instance, cover the shielded portion 220 shielded by the sliding members 120 and 120a in the original image 200 and a part of the effective portion 210 (such as the effective portion 210 adjacent to the shielded portion 220) via a cover region 230 such that a display image 200a is tidier. The cover region 230 can be a grayscale or color bar, but is not limited thereto. In an embodiment, relevant information such as conference information, time, and list of attendees can be further displayed on the cover region 230. Alternatively, referring further to FIG. 15, the shielded portion 220 shielded by the sliding members 120 and 120a and the part of the effective portion 210 (such as the effective portion 210 adjacent to the shielded portion 220) in the original image 200 can also be divided into a cutting region 240. In other words, the original image 200 is cut into a display image 200b such that the display image 200b does not have the shielded portion 220 shielded by the sliding members 120 and 120a. In the present embodiment, the display image is provided to other remote electronic devices via the electronic device 100; and in other embodiments, the display image is partially or completely displayed in the display module of the electronic device 100 or an external mobile electronic device such as a mobile phone, tablet computer, or personal computer.

Based on the above, the main body of the electronic device of the invention has an image module, each of the expanded members includes at least one of a radio module and a speaker module, the image module is exposed simply by moving the sliding member to capture an image, and the expanded members disposed beside the main body in a surrounding manner can be expanded toward different directions with respect to the main body and can receive the sound of users located in different direction or transmit sound to the users located in different directions to provide good video effect.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electronic device, comprising:
a main body comprising at least one image module;
a driver module movably disposed in the main body; and
a plurality of expanded members disposed beside the main body and linked to the driver module, wherein each of the expanded members comprises at least one of a radio module and a speaker module, the driver module is adapted to drive the plurality of expanded members to be expanded from a collapsed position to a use position,
wherein when the plurality of expanded members are located at the collapsed position, the plurality of expanded members are collapsed to the main body, and the plurality of expanded members are driven by the driver module to be expanded to the use position with respect to the main body.

2. The electronic device of claim 1, wherein the driver module contains a sliding member slidably disposed in the main body along an axis, wherein when the sliding member is located at a first position with respect to the main body, the sliding member shields the image module, and the plurality of expanded members are collapsed to the main body, and when the sliding member is moved to a second position along the axis with respect to the main body, the image module is exposed to the sliding member, and the plurality of expanded members are driven by the sliding member and expanded with respect to the main body.

3. The electronic device of claim 2, wherein the sliding member is a ring structure sleeved on the main body.

4. The electronic device of claim 2, further comprising:
a plurality of linkage rod groups respectively corresponding to the plurality of expanded members, each of the linkage rod groups comprising:
a first linkage rod fixed to the corresponding expanded member and comprising a first end and a second end opposite to each other, wherein the first end is pivoted to the sliding member; and
a second linkage rod comprising a third end and a fourth end opposite to each other, wherein the third end of the second linkage rod is pivoted to the second end of the first linkage rod, and the fourth end is pivoted to the main body.

5. The electronic device of claim 4, wherein when the sliding member is located at the first position with respect to the main body, an extending direction of the first linkage rod is not parallel to the axis.

6. The electronic device of claim 2, wherein the main body comprises a first magnetic pole, each of the expanded members comprises a second magnetic pole, magnetic property of the first magnetic pole and magnetic property of the second magnetic pole are the same, when the sliding member is located at the first position, a position of the second magnetic pole of each of the expanded members is away from the first magnetic pole of the main body, and when the sliding member is moved toward the second position, the second magnetic pole of each of the expanded members approaches toward the first magnetic pole of the main body and is subjected to a magnetic repulsion of the first magnetic pole and rotated outward with respect to the main body.

7. The electronic device of claim 2, wherein each of the expanded members is disposed beside the main body in a surrounding manner and comprises a first end portion pivoted to the sliding member and a second end portion away from the first end portion, when the sliding member is located at the first position, the second end portion of each of the expanded members is adjacent to the main body, and when the sliding member is moved toward the second position, the second end portion of each of the expanded members is away from the main body, and each of the expanded members is rotated outward with respect to the main body and expanded.

8. The electronic device of claim 7, wherein the main body comprises a first magnetic pole and a second magnetic pole arranged along the axis and having opposite magnetic properties, each of the expanded members comprises a third magnetic pole and a fourth magnetic pole having opposite magnetic properties, when the sliding member is located at the first position, the third magnetic pole and the fourth magnetic pole of each of the expanded members are respectively subjected to a magnetic attraction of the first magnetic pole and the second magnetic pole of the main body and collapsed to the main body, and when the sliding member is moved toward the second position, the third magnetic pole of each of the expanded members approaches toward the second magnetic pole of the main body and is subjected to a magnetic repulsion of the second magnetic pole and rotated outward with respect to the main body.

9. The electronic device of claim 8, wherein the sliding member comprises a limiting surface, and when the sliding member is located at the second position, a section of each of the expanded members adjacent to the first end portion is in contact with the limiting surface.

10. The electronic device of claim 7, wherein the main body comprises a guide groove extended along the axis, a normal direction of a bottom wall of the guide groove is not perpendicular to the axis, and the first end portion of each of the expanded members is slidably disposed in the guide groove along the bottom wall.

11. The electronic device of claim 10, wherein a depth of the guide groove is gradually reduced along the axis.

12. The electronic device of claim 7, further comprising:
a driving member disposed on a movement path of the sliding member, wherein one of the driving member and the main body comprises a chute and the other comprises a sliding block extended into the chute, the chute is not parallel to the axis, and when the sliding member is moved from the first position to the second position, the driving member is pushed by the sliding member and moved along an extending direction of the chute with respect to the main body, and each of the expanded members is pushed by the driving member and rotated outward.

13. The electronic device of claim 12, wherein the driving member comprises a support ramp, and when the sliding member is located at the second position, the support ramp supports a section of the corresponding expanded member adjacent to the first end portion.

14. The electronic device of claim 1, wherein the image module comprises at least one image capture module, and when the plurality of expanded members are located at the use position, the plurality of expanded members are driven by the driver module and expanded with respect to the main body, and the image capture modules are activated at the same time.

15. The electronic device of claim 1, further comprising a base detachably assembled to the main body.

16. The electronic device of claim 1, wherein the main body further comprises at least one of a wireless communication module, an output/input interface, and a battery.

17. The electronic device of claim 1, wherein when the plurality of expanded members are located at the use position, the plurality of expanded members are driven by the driver module and expanded with respect to the main body, and at least one of the radio module and the speaker module is activated at the same time.

* * * * *